(12) United States Patent
Ronen

(10) Patent No.: US 7,645,389 B2
(45) Date of Patent: Jan. 12, 2010

(54) PROCESS AND COMPOSITIONS FOR THE PURIFICATION OF WATER

(75) Inventor: Raziel Ronen, Tel Aviv (IL)

(73) Assignee: Dead Sea Medica Co., Ltd., South Wales (GB)

( * ) Notice: Subject to any disclaimer, the term of this patent is extended or adjusted under 35 U.S.C. 154(b) by 849 days.

(21) Appl. No.: 10/518,120

(22) PCT Filed: Jun. 19, 2003

(86) PCT No.: PCT/IL03/00521

§ 371 (c)(1),
(2), (4) Date: Jul. 12, 2005

(87) PCT Pub. No.: WO04/000736

PCT Pub. Date: Dec. 31, 2003

(65) Prior Publication Data

US 2006/0163163 A1    Jul. 27, 2006

(30) Foreign Application Priority Data

Jun. 20, 2002 (IL) .................................. 150341

(51) Int. Cl.
*C02F 1/52* (2006.01)
*C02F 1/24* (2006.01)
*C02F 1/56* (2006.01)

(52) U.S. Cl. .................. 210/705; 210/716; 210/727; 210/730; 210/731; 210/745

(58) Field of Classification Search .............. 210/705, 210/716, 727, 730, 731, 745
See application file for complete search history.

(56) References Cited

U.S. PATENT DOCUMENTS

| 4,029,578 | A | * | 6/1977 | Turk ........................... 210/760 |
| 4,405,464 | A | * | 9/1983 | Baldwin et al. ............. 210/717 |
| 4,780,214 | A | * | 10/1988 | Paulsson et al. ............. 210/719 |
| 5,855,789 | A | | 1/1999 | Smith et al. |
| 5,938,970 | A | | 8/1999 | Reilly, Jr. et al. |

FOREIGN PATENT DOCUMENTS

| EP | 0 263 090 | 4/1988 |
| WO | 01/28934 | 4/2001 |

* cited by examiner

*Primary Examiner*—Thomas M Lithgow
(74) *Attorney, Agent, or Firm*—Ladas and Parry LLP

(57) ABSTRACT

Process for water purification and for the separation of beneficial materials that are obtained from an aqueous solution, comprising determining a turbidity index and adding to the water or to said solution a composition comprising one or more natural or mixtures of natural substances, chosen from the group consisting of substances having a cationic molecular charge and substances having an anionic molecular charge, in an amount determined as a function of said turbidity index, thereby, allowing water purification and the aggregation of said beneficial materials.

22 Claims, 4 Drawing Sheets

PROCESS AND COMPOSITIONS FOR THE PURIFICATION OF WATER

FIELD OF THE INVENTION

This invention relates to processes and compositions for the purification of sea salt marine or sweet waters, that have been contaminated by having taken part in industrial processes or for other reasons. The compositions of this invention are essentially constituted by natural materials and may be prepared, and the processes of the invention may be carried out, by known and available apparatus.

BACKGROUND OF THE INVENTION

The problem of purifying waters of various origins for various purposes is greatly felt. One known way is to use coagulants, as iron chloride, aluminum sulfate, nepheline and others, with the addition of other flocculants and acids. The known coagulants have the problem of cost and limited applicability. In particular, they are mostly adapted to remove from waters molecules having a positive or a negative charge, but are not adapted concurrently to remove both kinds of molecules. Additionally, many materials presently used for water decontamination purposes are based on acrylic chemicals, which have toxic properties.

Selenium is contained in some natural waters, such as those of Ein Bokek in Israel, mostly in proteins and salt forms. Certain antitoxic and nutritional properties of selenium are known. However, no function of selenium is known in the removal of impurities of various kinds from contaminated waters, industrial or otherwise.

A purpose of this invention is to provide an economical purification process, based on natural materials and capable of being adapted to all or at least to most of the practical cases.

It is another purpose to purify waters having any kind of salt concentration.

It is another purpose to purify waters concurrently from molecules having a positive charge and from molecules having a negative charge.

It is a further process to provide a purification process that requires no special equipment.

It is a still further process to provide purification processes and compositions that do not comprise the presence or the use of poisonous materials.

It is a still further process to provide purification processes and compositions that have no ecological disadvantages.

Other purposes and advantages of the invention will appear as the description proceeds.

SUMMARY OF THE INVENTION

In one of its aspects, the invention provides a water purification composition, comprising an aqueous phase which contains from 5 to 10,000 and preferably 5 to 500 micrograms of selenium per liter. An example of such an aqueous phase, which is found in nature, is the water from the Ein Bokek springs, an analysis of which will be reported later. The aqueous phase could also result from the addition of one or more selenium compounds (e.g. selenium oxide, selenite, selenate or selenoproteins) to water not containing selenium or containing less than 5 micrograms of selenium per liter. The aqueous phase is preferably subjected to reverse osmosis by a membrane, preferably a carbon membrane having a pore size from 10 to 200 Angstrom. Membranes of polyamides or polysulfones, having a pore size of $1/10,000$ microns, or semipermeable membranes can also be used. The reverse osmosis is preferably carried out under a pressure differential of 1 to 50, preferably 5 to 15 atm, at temperatures from 1 to 40° C., preferably 10 to 20° C., at pH 2 to 10, preferably 4 to 6. If the pH of the water is higher than 8, and preferably if it is higher than 7, the water should be acidified by the addition of 0.1-10 wt %, preferably at least 2 wt %, of an acid or acids, to lower the pH to below 7. The acid is preferably an organic acid such as malic, acetic or tartaric acid. The resulting liquid is called herein Selenox-A. It can be used to purify waters containing heavy metals. Its most important use, however, is as starting material for the preparation of another water purification composition, indicated herein as Selenox-B.

A preferred aspect of the invention is the water purification composition Selenox-B, which comprises Selenox-A plus one or more natural or mixtures of natural substances, belonging to one of two classes: Class I—substances having a cationic molecular charge, and having typically an animal origin; and Class II—substances having an anionic molecular charge, and having typically a vegetal origin. Selenox-B comprising substances of Class I is used for purifying waters from contaminants having an anionic charge, while Selenox-B comprising substances of Class II is used for purifying waters from contaminants having a cationic charge. Both types of Selenox B may be used together for purifying waters containing both anionic and cationic impurities. For the sake of brevity, Selenox-B containing substances of Class I may be indicated as Selenox-B-I and Selenox-B containing substances of Class II may be indicated as Selenox-B-II.

The substances of Class I have a positive charge deriving from amino groups having molecular weight from 5,000 to 10,000,000 Daltons. Examples of such substances are chitin, oligosaccharides and polysaccharides. Possible sources of such substances are shellac, shells of crustaceans, crabs, shrimps, lobsters, marine zoo plankton, coral, jelly fish and the like. The marine sources are ground and dissolved, in water or in an acid according to their solubility. Powdery or ground material of this kind can sometimes be obtained from the open market. Shells or crustacean skeletons are soluble in acetic or malic acid.

For the preparation of Selenox-B-I, the substances of Class I, in powder form or flakes or granules or liquid form, are added to Selenox-A, in an amount from 0.1 to 10 grams and preferably from 2 to 5 grams, per liter of Selenox-A. If they are not soluble in Selenox-A, it may be necessary to add an acid in an amount of 1-5 wt % to cause them to dissolve. The solution is generally complete and no filtration is generally necessary.

Examples of waters for the purification of which Selenox-B containing substances of Class I is particularly adapted are waters contaminated with protein fats, bile acids or free fatty acids.

Non-limitative examples of substances of Class II are gums, fibers and cellulose. To prepare Selenox-B-II, a substance or substances of Class II, in powdery form or flakes or granules or liquid form, are added to Selenox-A, in amount from 0.1 to 19 grams and preferably from 2 to 5 grams per liter of Selenox-A. No filtration is generally necessary.

Another aspect of the invention is a water purification process, which comprises producing Selenox-A, mixing it to the water to be purified and removing any coagulated impurities by any suitable separation process, such as decantation, filtration or centrifugation. Mostly, this process is used for the removal of heavy metals, such as cadmium or mercury, and for this purpose Selenox-A is used in amounts from 1 to 10 milliliters, and preferably from 4 to 6 milliliters per liter of contaminated water. It is possible, when certain heavy metals, particularly poisonous ones, lie arsenic, are to be removed, to carry out a preliminary treatment with ozone, before using Selenox-A. Selenox-B-I and/or -II cane be used in a final water purification treatment.

A preferred purification process comprises producing Selenox-B-I and Selenox-B-II, adding, or injecting by means of a metering pomp, Selenox-B-I in an amount from 1 to 10 milliliters, and preferably 4 to 8 milliliters, per liter of contaminated water, mixing under stirring, then, preferably after a few seconds, e.g. 2-5 seconds, adding Selenox-B-II in an amount from 1 to 10 milliliters, and preferably 4 to 8 milliliters, per liter of contaminated water and mixing under stirring. If the mixing action is very effective, it may be acceptable to add both of said components together while mixing. It is to be noted that the two Selenox-B's should be kept in separate containers and not be mixed under any other circumstances. This treatment causes the formation of coagulated material which may float, sink—sediment or sludge—or remain mixed with the body of water. The coagulated material is separated by any suitable mechanical means. If it floats, it may be skimmed, decanted or sucked; if it sinks, it is preferably separated by decanting the purified water off; if it remains mixed, it must be separated by centrifugation, filtering, squeezing e.g. by belt-press, and the like.

In another, preferred embodiment, the purification process of the invention comprises a, second stage, which is auxiliary and while economically important, is not a necessary component of the purification of water. This is the treatment of a coagulated material separated. This material contains 40-60 wt % of water. The water should be separated to the extent of reducing its content to 1-20 wt %, preferably not more than 5 wt %, by any suitable means, such as a centrifuge, a filter, a spray dryer, a belt press or a worm squeezer, and can be added to the purified or unpurified main body of water, or fed back to any appropriate use. The dry or semi-dry residue can be used for any purpose consistent with its composition, for instance, as a compost, fertilizer or fuel, after any appropriate treatment to render it good for that use.

The invention may be implemented with auxiliary or alternative treatments. The auxiliary treatments may include:

If the treated water still contains organic solutes, e.g. phenol, it is desirable to add microorganisms, such as *Bifidophilus, Lactobacillus*, or *Acidophilus*, as last step in the preparation of Selenox-A.

DETAILED DESCRIPTION OF PREFERRED EMBODIMENTS

The aqueous phase for the preparation of Selenox-A may be, as has been said, natural water from the springs of Ein Bokek in Israel, or plain water with the addition of Selenium. An analysis of the Ein Bokek water is the following:

| Selenium [SE] | µg/lit | 780 |
|---|---|---|
| Zinc [Zn] | µg/lit | 100 |
| Copper [Cu] | µg/lit | <10 |
| Chromium [Cr] | µg/lit | <10 |

-continued

| Iron [Fe] | µg/lit | 10 |
|---|---|---|
| Manganese [Mn] | µg/lit | <10 |
| Magnesium [Mg] | µg/lit | 63500 |
| Calcium [Ca] | µg/lit | 107000 |
| Potassium [K] | µg/lit | 11700 |
| Sodium [Na] | µg/lit | 237000 |

The parameters which are to be considered in deciding what kind of substance I or II are the following:

the value of the pH;

the electrical conductivity (misromos/cm—µS/cm);

the chemical oxygen requirement (COD) (if more than 5 g/lt);

the biological oxygen requirement (BOD), viz. the amount of oxygen required for oxidizing the organic substances in the waste water (if more than 5 g/lt);

total fat;

mineral fat;

chlorides;

sulfates;

nitrates;

nitrites;

cyanides;

sulfides;

phenols;

floating solids;

suspend and dissolved solids (if more than 5 mg/lt);

anionic detergents;

dissolved oxygen;

heavy metals;

proteins;

pesticides.

If the pollutant is anionic, Selenox-B-I is used; if it is cationic, Selenox-B-II is used; if both anionic and cationic pollutants are present, Selenox-B-I and II are used together.

If it is found that if the only contamination is heavy metals, the addition of Selenox-A in an amount 1:10 milliliters to a liter of contaminated water is sufficient. The mixture is to be stirred for three minutes or thereabout and thereafter, the coagulated material must be allowed to sink or float according to its specific weight. Thereafter, the foreign materials which have become attached to the Selenox-A must be separated mechanically, for instance by filtering, centrifugation, aspiration, or by squeezing. The heavy metals which may have become attached to the Selenox-A, can be subjected to burning by the addition of oxygen. Ozone can be used before or after the treatment of the water with Selenox A.

Figure 3:
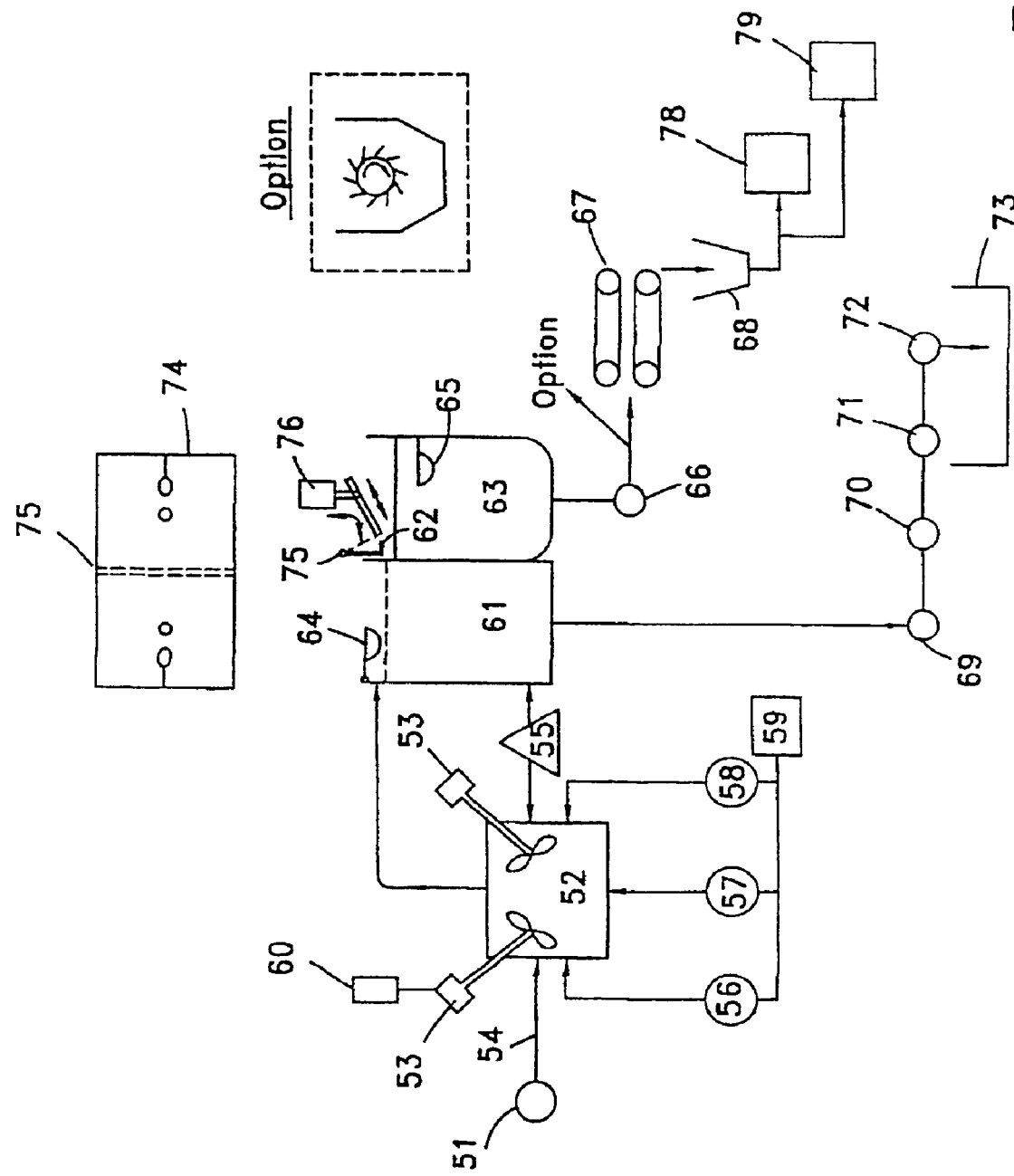

If the contaminated water contains contaminants other than heavy metals, Selenox-B should be used, in the amounts of 1-10 milliliters of Selenox-B-I and 1-10 milliliters of Selenox-B-II to a liter of the water. If the water can be well mixed by stirring, optionally with the introduction of air under pressure, so as to result in a uniform liquid phase, Selenox-B-I and Selenox-B-II can be added together. If the mixing is not fully satisfactory, Selenox-B-I should be added first, then the liquid phase should be mixed, e.g. after 1-5 seconds, and Selenox- B-II should be added followed by further stirring. In flotation systems, hereinafter described, the water containing Selenox-B-I and II should be allowed to stand after the end of the stirring for about five minutes, if the impurities precipitate—if they float, one operates as illustrated in FIG. 3. The contaminants then become attached to the Selenox-B and should be removed from the water by mechanical means, such as flotation, skimming, precipitation, filtration, centrifugation, absorption, pressuring, decantation, suction, or any other suitable means. The separated contaminants may be useful for various purposes, such as for making a compost and keeping in mind in this case the additional steps hereinbefore described should be taken. If the contaminants are not ecologically acceptable, one should dispose of them in a suitable way or burn them, with the addition of oxygen, if required.

A novel method for determining the level of contamination in water and for determining the amount of Selenox B I and II required to clean (purify) the water, is also a part of the invention. Materials which lessen the clarity of the water and the passage of light exist in contaminated water. Today the amount of contaminated material in water is measured by methods like BOD and COD, turbidity and conductivity, etc. A preferred method, according to the invention, includes the determination of a turbidity index, which could also be called contamination index, indicated herein as SX. The higher the SX, the lower the level of contamination.

The new method measures the amount of light that passes through the contaminated liquid before and after treatment with said substances, the amount of light being translated into units of milli-volts which are preferably created by a solar cell which is placed under the vessel containing the contaminated liquid.

The turbidity index, as understood herein and related to the present invention, is directly proportional to the amount of light that passes through the liquid. For the purposes of this invention and this specification, said index—SX—is defined by the following formula:

$$SX = \frac{\text{voltage}}{\text{water volume}} = \frac{mV}{cm^3}$$

wherein the voltage is measured as described hereinafter.

Figure 4:
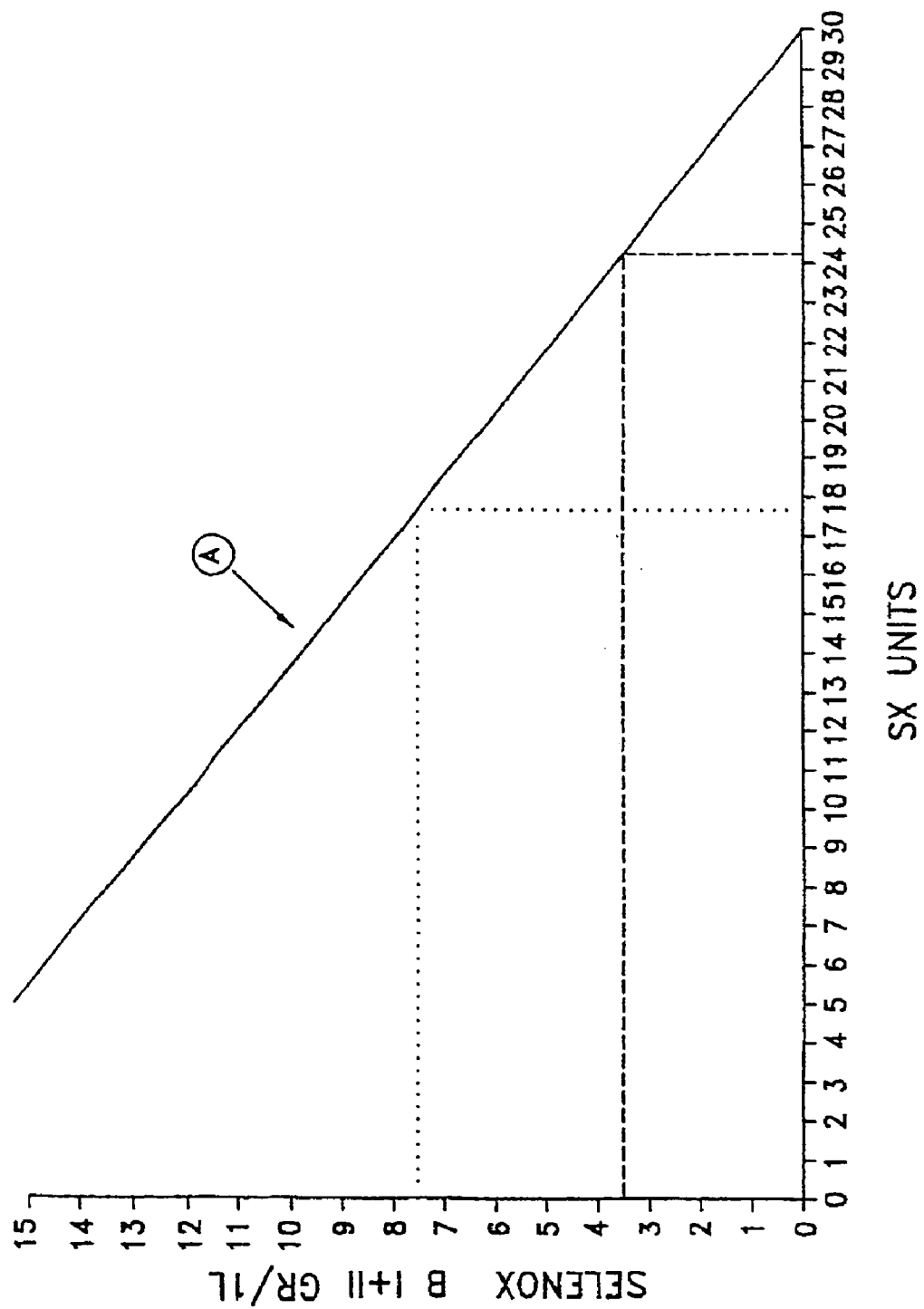
FIG. 4 is a graph for determining the amounts of Selenox-B's required as a function of turbidity index.

For each SX, an optimal amount of Selenox-B-I and Selenox-B-II for water purification can be determined. The relationship between said optimal amount and the SX value is illustrated in FIG. 4.

The equipment preferably used for determining the turbidity index comprises:

1. Solar Cell, Model 816-3

The electrical output is 0.45V-400 are, under DC (not alternate). The areas of tension creation, measured in mille-volts, a width of 3.6 cm and a length of 6.5 cm, area of reception of 23.4 cm$^2$ 2. Lamp-Type of Reflector

| Designation | R 80 30° |
| Power | 75 watt |
| Luminous flux | 730 lm (level of light) |
| Light color | WW |
| Catalog N° Philips | R 80 |
| Catalog N° General Electric | 75E80/E27 |
| Inlet current | 220 V |

3. Digital Mill Volt Meter

Measures D.C. tension

Area of measurement on a scale of 0-2000 mill volts

4. Examination Spoon

Pyrex cup 1000 ml. made by Labor, TGI, Germany (Standard laboratory equipment)

5. pH Meter or Measuring Strip Made by Macherey Nagel, Germany

The test should be carried out in total darkness and the equipment and materials for it should be prepared by placing the solar cell on a surface and attaching it to a digital volt meter, and placing the reflector lamp at a height of 150 mm. above the solar cell.

The standards of the equipment should be checked by turning on the reflector lamp at a height of 150 mm from the solar cell in total darkness: the standard reading needs to be 549±3 millivolts.

The determination of level of SX (measure of units of turbidity) is carried out as follows:

Preparation of the example for the test:

1. stir (mix) the contaminated liquid 2. pour into pyrex beaker in amount of 75 ml.

3. place beaker above the solar cell 4. set the height of the reflector lamp at 150 mm above the solar cell.

5. light the reflector lamp 6. turn on the digital millivolt meter in the scale of 0-2000 mv.

7. measure tension of the substance by means of solar cell and record.

EXAMPLE 1

In contaminated water from Syncrude, Canada, the test showed 512 mV. The pH value was 9.

The SX (units of turbidity) value of the untreated water is defined by the formula:

$$SX = \frac{\text{voltage}}{\text{water volume}} = \frac{mV}{cm^3}$$

The voltage is measured in mV. The water volume is calculated by multiplying the surface area of the solar cell by the height of the contaminated water. In this example and in the following ones the width of the solar cell is 3.6 cm, its length is 6.5 cm, so that its surface area is 23.4 cm$^2$. The height of the contaminated water in the pyrex beaker is 0.9 cm. The water volume is 0.9×23.4 cm$^3$=21.06 cm$^3$. Therefore:

$SX=512/21.06=24.31$

At such a level of SX there is a need to use Selenox-B of both types I and II in the amounts of 3.5 gr Selenox-B-I per liter of contaminated water 3.5 gr Selenox-B-II per liter of contaminated water After purifying the water with Selenox-B I and -II, sedimenting coagulant material and decanting, the level of SX turbidity is measured again, as before.

The result: 562 mV. The pH value is now 8. The level of turbidity is:

$SX=562/21.06=26.68$

EXAMPLE 2

In contaminated water from Fine Tails of Oil Sand of Suncore, Canada (the pH of which was 7), the voltage, found in the turbidity test carried out as in Example 1, with the same equipment, was 512 mV. Therefore:

$$SX=512/21.06=24.31$$

The turbidity of the untreated water is the same as in Example 1, and, once again, there is a need to use Selenox-B of both types I and II in the amounts of 3.5 gr Selenox-B-I per liter of contaminated water
3.5 gr Selenox-B-II per liter of contaminated water After purifying the water using Selenox-B-I and -II, sedimenting the coagulant material and decanting the water, the voltage was 565 mV and $$SX=565/21.06=26.82. \ 26.82 \ units$$

EXAMPLE 3

The water to be purified was contaminated by sand and organic materials from a source of potatoes for the preparation of chips. The same equipment and the same method of the preceding examples were used to determine its turbidity. The pH was 7. The voltage found was 376 mV. Therefore:

$$SX=376/21.06=17.85$$

With such a turbidity level, Selenox-B-I must be used in an amount of 7.5 gr per liter of contaminated water and Selenox-B-II must be used in an amount of 7.5 gr per liter of contaminated water. The method of use is injection or addition of B-II, mixing for 5 seconds and afterwards, adding B-I and mixing for another 10 seconds. The process of creating the coagulant material continues for 2 to 5 seconds. Afterwards, the coagulant material was separated by a filter and voltage for the clean water was 567 and $$SX=567/21.06=26.92$$

Figure 1:
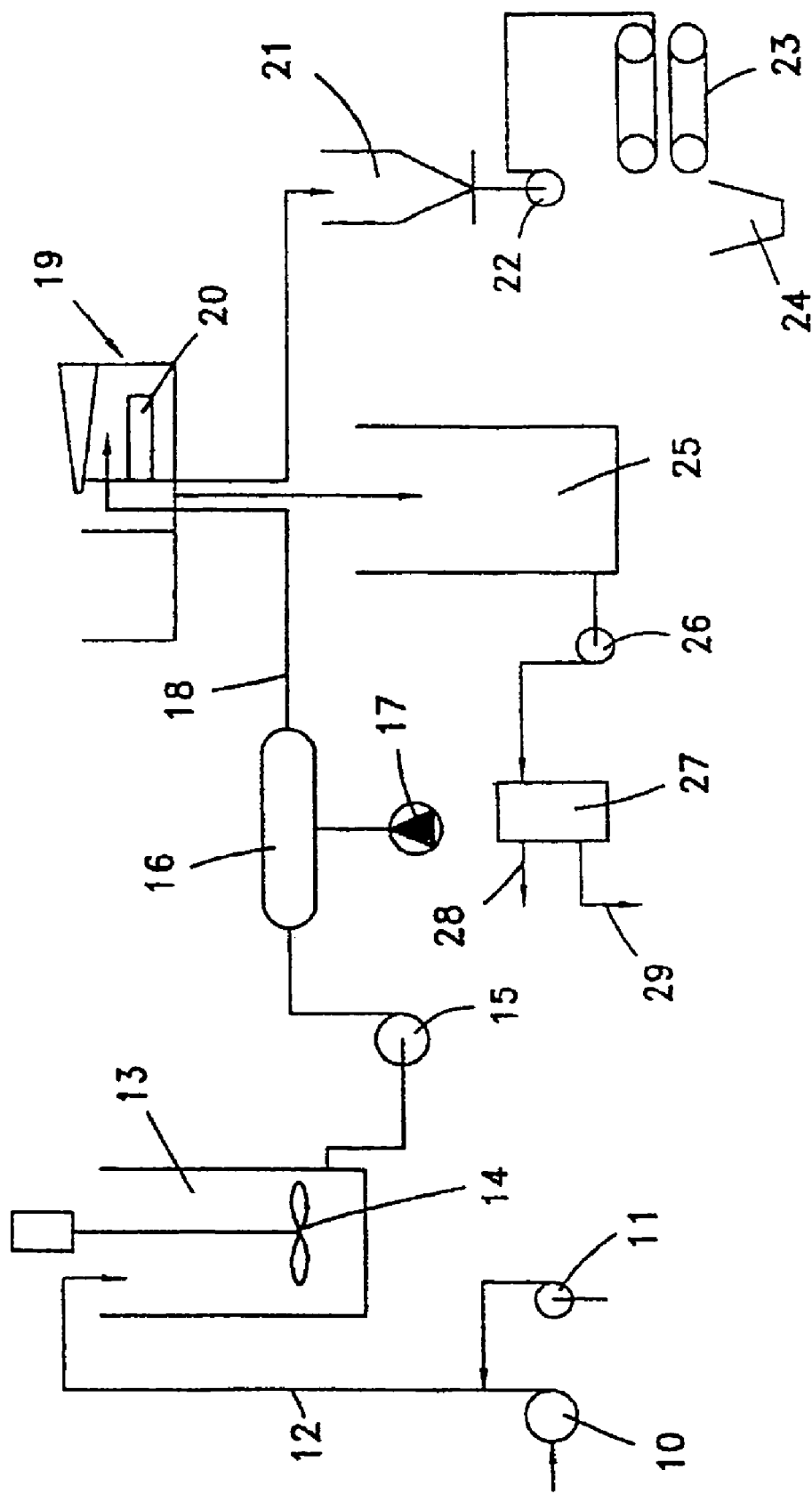
FIGS. 1, 2 and 3 schematically represent water purification apparatus according to two embodiments of the invention and the corresponding processes.

FIG. 1 schematically represents a water purification apparatus according to an embodiment of the invention, and schematically illustrates the corresponding water purification process. Numeral 10 indicates a pump which draws the contaminated water, for instance from a sewer or from any other source. Numeral 11 indicates a pump which draws Selenox-A and/or Selenox-B-I and II, according to the particular contaminants that must be removed. The Selenox mixes with the water and the mixture is conveyed through conduit 12 to a vessel 13 provided with an agitator 14, in which the mixture is homogenized. The homogenized mixture is conveyed by pump 15 to vessel 16, to which compressed air is fed by compressor 17. The contents of vessel 16 pass through conduit 18 to a flotation vessel 19, wherein the coagulated material, containing the contaminants, forms a floating layer schematically indicated at 20. The purified water is discharged by gravity into vessel 25, and therefrom, through pump 26, into a filter 27, from which the filtered water is discharged at 28 and sent to its final destination, and can be treated by ozone or UV or R.O. (reverse osmosis), while the filter cake is discharged at 29. The coagulated, floating layer 20, containing 40-60 wt % of solid material, is treated, in this embodiment, to recover said solid material, but in other embodiments of the invention said recovery could be omitted. Layer 20 is conveyed by gravity to vessel 21, and from it, through pump 22, to an apparatus for removing an amount of water, schematically indicated as a belt press 23. The resulting material, having a content of solids of 88-95 wt %, is discharged into pump 24. The discharge of the water removed is not indicated. The coagulated material could be separated in other mechanical ways, well within the capabilities of skilled persons, e.g. by filtration, centrifugation and the like. If, instead of floating, it precipitated to the bottom of vessel 19, it could be discharged from said bottom. The reduction of the water content of the coagulated material, if desired, could be effected by any convenient apparatus, instead of by a belt press. Skilled persons, therefore, can derive from the above description of an apparatus according to an embodiment of the invention, all the information that may be required for other embodiments.

Figure 2:
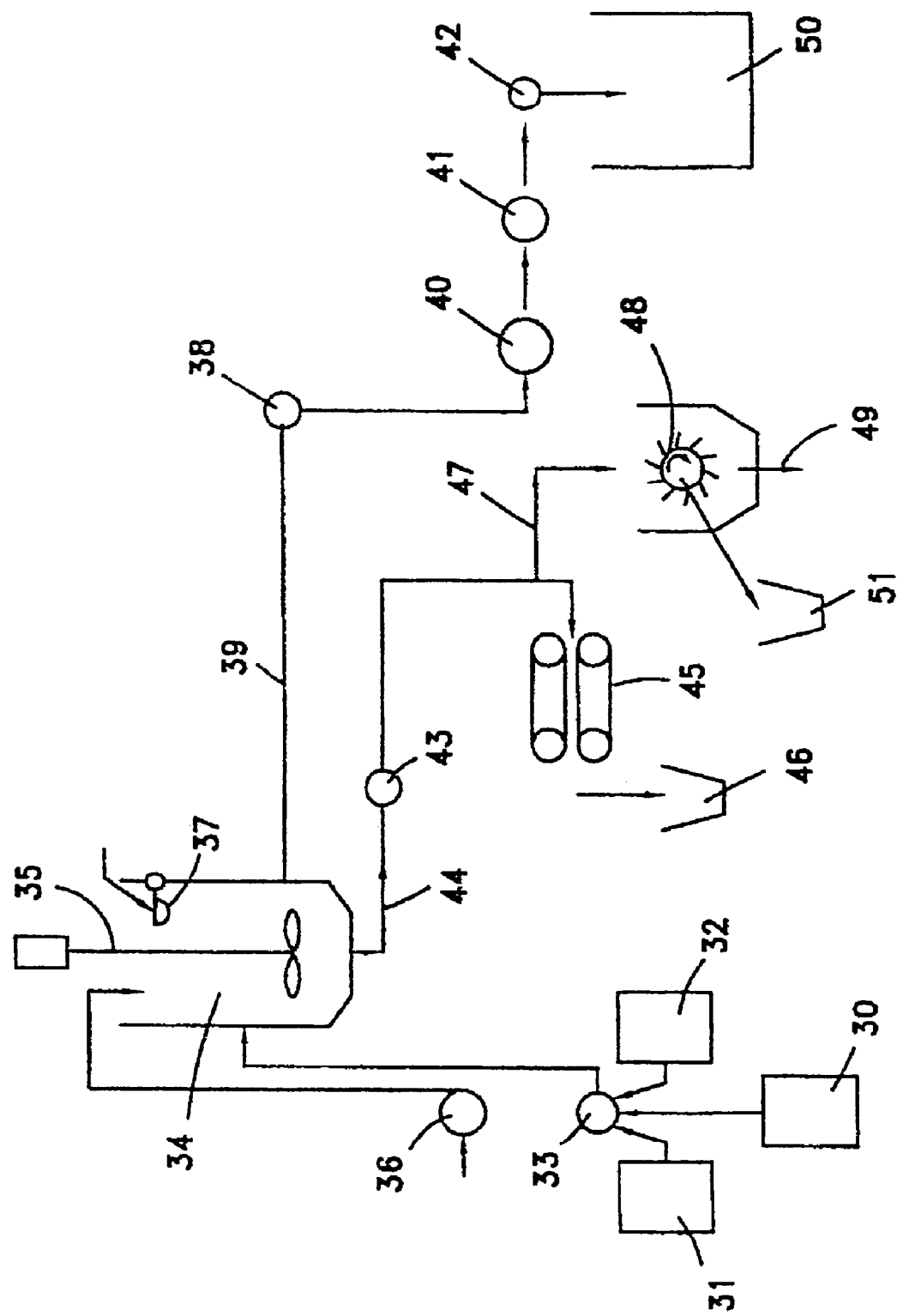

FIG. 2 schematically represents a water purification apparatus according to another embodiment of the invention, and schematically illustrates the corresponding water purification process. 30, 31 and 32 are containers of Selenox-A, Selenox-B-1 and Selenox-B-2 respectively. 33 is a pump for drawing the contents of said containers, chosen as desired and conveying them to a mixing vessel 34 provided with agitator 35, to which the water to be purified is fed by pump 36. A float 37 controls the level of the water in vessel 34. A pump 38 draws the purified water from vessel 34 through line 39, and conveys it to self-cleaning filter 40, thence to a bacteriologic purification apparatus comprising UV lamps and an ozone purifier, and finally to a reverse osmosis apparatus 42 from which they are discharged into vessel 50. The quality required of the water after treatment determines the purifier to be used. If the water is to be employed in or in the preparation of food, UV or ozone should be used; if it is desired to reduce the content of salts, R.O. is required. The coagulated impurities, which in this embodiment are assumed to have settled to the bottom of vessel 34, are drawn by pump 43 through line 44 and conveyed to a belt press 45 or alternative device in which a major part of the solid matter is separated and conveyed to a collection vessel 46, while the separated liquid is optionally conveyed through line 47 to centrifuge 48, from which water is discharged at 49 while the solid matter is discharged into vessel 51 for further processing, if desired.

Using the embodiment of FIG. 2, the purification of the water can be effected in a short time, e.g. 0.5 minute only, and in a very simple manner. A single unit of FIG. 2 works by batches and continuously. To work continuously, one may use a number of such units, working alternatively in succession, or use the floating system illustrated in FIG. 3

FIG. 3 describes the method of separation that combines the use of Selenox A, B-I and B-II, as needed, mixed together with compressed air and contaminated water. The contaminated water reaches treatment when the coagulant material is already almost completely processed, in the container (61). Where exists immediate flooding (glutting) of the coagulated material, the material floats until the float (64) operates the door (62), and it does this only when the surface of the water in the container (61) is covered with a thick layer of coagulated material. The coagulated material is poured into the container (63) by force of gravity alone when the door (62) is opened by a motor or mechanism (66).

The following items exist inside the container (61):

1. contaminated water that has almost completed the process of separation between the contaminants and the water that penetrates into them;

2. a stream of compressed air enters from the bottom (55) and raises particles which have not yet been trapped in Selenox-A, B-I and B-II, and makes possible the flow of clean water permanently on the bottom and above (beyond) the pump (69).

The numerals in FIG. 3 have the meaning indicated below:
(51) pump for pumping contaminated water into the installation for treatment
(52) mixing chamber
(53) whirlpools
(54) entry pipe to mixing chamber
(55) air compressor for chamber (52) and also for container (61)
(56) container of Selenox-A
(57) container of Selenox-B-I
(58) container of Selenox-B-II
(59) main control board
(60) control board of floaters and mixers
(61) flotation container
(62) door that opens for release of layer of coagulated materials
(63) container for collection of coagulated materials
(64) floater which operates the opening of the door (62) and prevents the overflow of contaminated water into the container (61).
(65) floater that operates the pump (66) and prevents overflow of coagulated materials from outside the container (63)
(66) pump for pumping coagulated materials to a belt press or like device
(67) belt press or like device
(68) container for storing extracted coagulated material
(69) pump for pumping clean water
(70) self-cleaning filter
(71) UV device (optional)
(72) ozone device (optional)
(73) device for collection of pure water
(74) view from above of containers (61) and (63) when (62) is closed.
(75) hinge for door (62)
(76) device for opening and closing door (62)
(78) device for compost (optional)
(79) incinerator (optional)

Additional options exist for treatment of water after (52—the mixing chamber)—a centrifuge or a filtration. If one of these methods is used, there is no need for devices, 63, 67, 68, 78.

FIG. 4 is a diagram showing the dependence of the amounts of Selenox-B-I and -II from the value of SX. It is seen that the dependence is linear. The diagram refers to the case that both anionic and cationic pollutants are present and therefore the said two types of Selenox-B are used in the same amount; if one kind of pollutant is present in a heavily prevalent amount, the type of Selenox-B that is adapted to remove that kind will be used in an amount correspondingly greater amount than the other type. Selenox-A will be used when there are heavy metals in the pollutants.

The value of the SX should be understood as measured by the method and equipment described hereinbefore. It is seen that the linear dependence is such that 10 gr/lt of the Selenox's corresponds to an SX of about 13.5.

Types of polluted water that can be purified according to the invention are, for example:

1. Heavy metals.
2. Textiles fibers and colors.
3. Food: water contaminated by oil, proteins, starch and sand and organic materials for the preparation of potato chips.
4. Mineral oil.
5. Paper industry: paper recycling and manufacture of paper.
6. Sewage, industrial and human.
7. Petrochemical industry: cleaning of tailings (remains of water from soil flushing).
8. Mines and caves: cleaning of tailings.
9. Sea water polluted by oil, algal pollution or sewage.
10. Water in use on ships, polluted by oil leakage from the deck.
11. Pesticides.
12. River and creek water.
13. Irrigation water for private gardens and agricultural grounds.
14. Water for the cleaning of aircrafts: remains of paint peeling from aircrafts in the course of periodic paintings.
15. Leather industry: colors and salts.
16. Car washing sites.
17. Detergents.
18. Drinking water polluted by sand, algae and/or insects.

In an embodiment of the invention, contaminated water may be scrubbing water that has been used to clean gases entraining contaminating matter, e.g. trapped particles of soot. Such gases may be exhaust gases from chimneys or exhaust pipes of cars. In such cases, the gases may pass through water retained in a container. In said embodiment, the water will contain Selenox-B-I and -II. In time, the amounts of contaminants trapped in the water may exceed its ability to remove contaminating matter and the ability of the Selenox's to rap it. Then the water will be changed to clean water to which the Selenox's will be added.

According to a preferred embodiment of the invention, the fact that the process described hereinabove uses trapping of unwanted particles, is used for trapping beneficial particles of interest, having a negative or positive charge. Therefore, the same process is used for the separation and aggregation of beneficial materials that are obtained from aqueous solutions, such as extraction of starch, sugar, algal materials for nutritional or medical uses, pro-biotic bacteria settlement, etc.

While a number of examples have been given by way of illustration, it should be understood that the invention can be carried out with many modifications, variations and adaptation

The invention claimed is:
1. Water purification process, which comprises
    i) producing a composition comprising an aqueous phase which contains from 5 to 10,000 micrograms of selenium per liter;
    ii) mixing said composition to the water to be purified; and
    iii) removing any coagulated impurities from the mixture by any suitable separation process.
2. Water purification process according to claim 1, which comprises
    i) producing at least one composition comprising an aqueous phase which contains from 5 to 10,000 micrograms of selenium per liter and one or more natural substances selected from the group consisting of substances having a cationic molecular charge and substances having an anionic molecular charge;
    ii) adding said composition to the water to be purified, mixing under stirring, allowing coagulated material to form in said water containing said composition;
    iii) and separating said coagulated material from said mixture.

3. Water purification process according to claim 2, which comprises producing a composition comprising an aqueous phase which contains from 5 to 10,000 of selenium per liter, subjected to reverse osmosis and optionally acidified.

4. Process according to claim 2, wherein the coagulated material is separated by mechanical means.

5. Process according to claim 2, wherein the coagulated material is separated by floating or by injecting air, and then treated in an incinerator.

6. Process according to claim 2, wherein the coagulated material is separated by introducing it into centrifugation apparatus or sedimentation apparatus for continuous treatment.

7. Process according to claim 2, further comprising separating part of the water from said mixture and using the dry or semi-dry residue, after any appropriate treatment.

8. Water purification process according to claim 1, comprising determining a turbidity index of the water to be purified and adding to the water a composition comprising one or more natural substances selected from the group consisting of substances having a cationic molecular charge and substances having an anionic molecular charge, in an amount determined as a function of said turbidity index.

9. Process according to claim 8, wherein the function is a linear function.

10. Process according to claim 8, comprising the separation of beneficial materials that are obtained from an aqueous solution, comprising determining a turbidity index of said solution and adding to said solution a composition comprising one or more natural substances selected from the group consisting of substances having a cationic molecular charge and substances having an anionic molecular charge, in an amount determined as a function of said turbidity index, thereby allowing the aggregation of said beneficial materials.

11. Process according to claim 10, wherein the beneficial materials are selected from the group of starch, sugar, algal materials for nutritional or medical uses, and pro-biotic bacteria settlement.

12. Process according to claim 2, wherein said aqueous phase contains from 5 to 500 micrograms of selenium per liter.

13. Process according to claim 2, wherein said aqueous phase is selected from the group consisting of water to which selenium has been added and water from the Bin Bokek springs of Israel.

14. Process according to claim 2, wherein said composition is subjected to reverse osmosis.

15. Process according to claim 2, wherein said composition is subjected to acidification by the addition of 0.1-10 wt % of acids.

16. Process according to claim 2, wherein said substances having a cationic molecular charge are of animal origin.

17. Process according to claim 2, wherein said substances having an anionic molecular charge are of vegetable origin.

18. Process according to claim 2, wherein said substances having a cationic molecular charge have a charge derived from amino groups, and their molecular weight is from 5,000 to 10,000,000 Daltons.

19. Process according to claim 18, wherein said substances are selected from the group consisting of oligosaccharides and polysaccharides.

20. Process according to claim 19, wherein said substances comprise chitin.

21. Process according to claim 18, comprising obtaining, by solution or extraction, substances from raw materials selected from the group consisting of shellac, shells of crustaceans, crabs, shrimps, lobsters, marine zoo plankton, coral, and jelly fish.

22. Process according to claim 2, wherein said substances having an anionic molecular charge are selected from the group consisting of gums, fibers, and cellulose.

* * * * *